Patented Aug. 4, 1925.

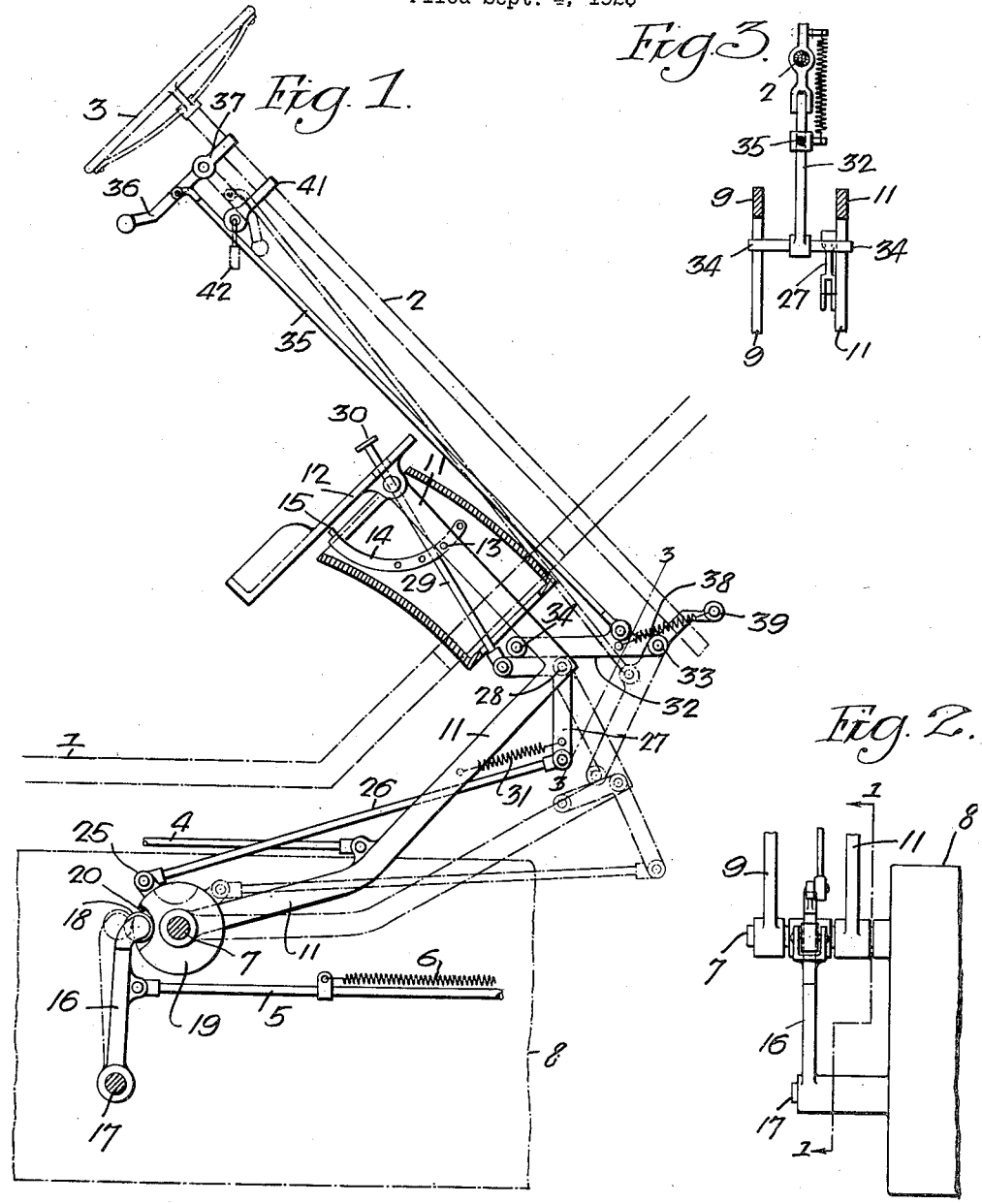

1,548,725

UNITED STATES PATENT OFFICE.

ALBERT H. MANWARING, OF NOBLE, PENNSYLVANIA, ASSIGNOR OF ONE-HALF TO ROY A. MANWARING, OF NOBLE, PENNSYLVANIA.

CONTROL MECHANISM FOR MOTOR VEHICLES.

Application filed September 4, 1923. Serial No. 660,841.

*To all whom it may concern:*

Be it known that I, ALBERT H. MANWARING, a citizen of the United States, residing in Noble, Montgomery County, Pennsylvania, have invented a Control Mechanism for Motor Vehicles, of which the following is a specification.

This invention relates to apparatus for controlling the operation of a motor vehicle and more particularly one equipped with fluid controlled transmission mechanism such as that described and claimed in my application No. 432,748 filed December 23, 1920.

One object of the invention is to provide a relatively simple, substantial and convenient combination of controlling devices whereby the element for governing the fuel supply of an engine shall be operatively associated with the brake mechanism for the vehicle driven by such engine, the arrangement being such that the fuel controlling pedal or equivalent element is mounted on or immediately adjacent the brake pedal so as to be movable therewith or independently thereof by the operator's foot on such pedal.

A further object of the invention is to provide a fuel controlling device including an operating member preferably though not necessarily mounted adjacent the brake controlling member and so assembled with other elements that the supply of fuel for an engine is cut off or diminished by a movement of said operating member away from the operator.

I also desire to provide a novel combination of apparatus including fuel controlling means mounted on a portion of the braking mechanism so as to be either movable therewith or operative independently thereof.

It is further desired to provide a novel combination of apparatus for controlling the operation of a motor vehicle, whereby it shall be possible to hold or lock a clutch in its released position while the engine with which said clutch is associated is permitted to run idly,—the invention also including means whereby the brake is likewise locked in its applied position.

Another object of my invention is to provide a novel mounting for a pedal plate on its supporting member whereby it is possible to adjust the angular position of said plate to adapt it for the most comfortable operation.

These objects and other advantageous ends I attain as hereinafter set forth, reference being had to the accompanying drawings, in which, Fig. 1 is a side elevation, partly in vertical section, illustrating a vehicle-controlling mechanism constructed and arranged in accordance with my invention;

Fig. 2 is a fragmentary elevation of a portion of the apparatus shown in Fig. 1; and, Fig. 3 is a sectional view further illustrating certain of the parts of my invention.

In the above drawings, 1 represents a portion of the floor board of a motor vehicle equipped with a steering post 2, at the upper end of which is mounted a steering wheel 3. Any suitable or desired form of brake mechanism is connected to an operating rod 4 in such manner that longitudinal movement of said rod toward the right will cause application of the brake while its movement in the opposite direction will cause release of said mechanism. Further, any suitable form of fuel controlling apparatus is provided with an operating rod 5 so mounted and connected that longitudinal movement toward the left in opposition to a spring 6 will cut off or diminish to any desired extent the supply of fuel, while a movement toward the right under the action of said spring will so operate said apparatus as to supply fuel in greater or less amounts to the engine.

Any desired form of fluid or other clutch is controlled through a shaft 7 which projects from a casing 8 and has keyed or pinned to it a clutch operating lever 9 on whose upper or free end is carried a suitable pedal (not shown). Loosely mounted on the shaft 7 is a second lever 11 similar to the lever 9 and connected to the brake controlling rod 4. This second or brake lever 11 likewise has mounted on its upper end a pedal in the form of a plate 12 designed for the reception of an operator's foot and like the pedal of the clutch lever 9 is preferably pivoted to its lever. The latter in both cases has adjustably connected to it, as by a bolt 13, a motion limiting segment 14 formed with a number of holes (Fig. 1) and so mounted that one of its ends extends immediately under the pedal plate with which it is associated. Said plate is thus supported at an angle which may be found most comfortable for the operator's foot. The end of each segment 14 adjacent its pedal plate is preferably provided with a plug 15 of fibre or equivalent material to prevent noise when said pedal plate is subjected to vibration.

In accordance with my invention, the fuel controlling rod 5 has its otherwise free end connected to a lever 16 fulcrumed to or pivotally mounted on a post or stud 17 projecting from the casing 8 and at its upper end carrying a roller 18 designed to cooperate with a cam 19. The latter is rotatably mounted on the clutch-controlling shaft 7 preferably between the two levers 9 and 11, and as illustrated has the form of a circular disc in the edge of which is formed a notch or depression 20 capable of receiving the roller 18.

Said depression is of such depth that when the roller 18 rests fully therein, the lever 16 occupies such a position that the throttle valve or other fuel controlling device associated with the rod 5 is fully opened and the engine supplied therefrom receives a maximum amount of fuel. The cam 19 is so designed, however, that when it occupies such a position that the roller 18 rests upon its circular periphery, the lever 16 is so positioned that fuel is either wholly cut off from the engine or is reduced to a definite, relatively small amount.

For rotating the cam 19 to move the lever 16 to either of its positions above indicated or to bring it to any intermediate position, said cam has a projecting arm or lug 25, which through a link 26 is connected to one arm of a lever 27 fulcrumed at 28 to the brake lever 11. The second arm of the lever 27 has connected to it one end of a push rod 29 whose opposite end extends through and terminates immediately above the brake controlling pedal 12. The upper end of the said push rod is preferably formed with a head 30, and it is normally drawn toward or maintained in its elevated position by a spring 31 connected between one arm of the lever 27 and the body of the lever 11.

With this arrangement of apparatus, it is obvious that pressure exerted upon the head 30 will turn the lever 27 against the action of the spring 31 and through the link 26, will rotate the cam 19. If such pressure on the head 30 be sufficiently powerful, the resulting turning of the cam 19 will cause the roller 18 to be moved wholly out of the recess 20 and on to the circular periphery of the cam, thus so moving the lever 5 as to completely cut off the fuel supply of the engine or diminish it to a predetermined extent. On the other hand, by relaxing the pressure on the head 30, the cam 19 may be permitted to return either to or toward the position shown in Fig. 1, in which the roller 18 engages the bottom of the recess 20 and the lever 16 occupies such a position that a maximum supply of fuel is delivered to the engine.

Since the lever 27 is mounted on the lever 11, and the push rod 29 extends through the pedal 12, the head 30 may be engaged by the foot of an operator on said pedal 12, so that when the latter is depressed, as required to apply the brake mechanism connected to the rod 4, the lever 27 is necessarily so shifted as to rotate the cam 19 and by forcing the roller 18 out of the depression 20, cut off or cut down the supply of fuel to the engine. On the other hand, a relaxation of the pressure on the pedal 12 sufficiently to allow it to return to its normal position shown in the drawings, will permit longitudinal movement of the push rod 29 under the action of the spring 31 and return of the cam 19 toward or into the position shown in full lines in Fig. 1, in which a maximum amount of fuel is supplied to the engine.

In order to hold the brake lever 11 in its brake applying position with the fuel cut off or throttled, I provide a lever 32 pivoted at 33 to some fixed structure and having a transversely extending arm 34 positioned to project over both said brake lever 11 and the clutch lever 9. Through a link 35 extending up along the steering post 2, I connect this lever 32 with a controlling lever 36 pivoted to a collar 37 fixed to said steering post immediately adjacent the wheel 3. A spring 38 extending from a fixed lug 39 to the lever 32 tends to hold this latter in its upper position with the lever 36 likewise elevated. When, however, the clutch and brake levers have been moved by pressure on their pedals, to their clutch releasing, brake-applying positions, the lever 36 may be swung from the position shown in full lines to the position shown in dotted lines, so that the cross arm 34 of the lever 32 will engage both the clutch and the brake levers. The lever 36 may be held in this depressed position by providing a yoke 41 on the steering post 2 to which it may be locked by means of a suitable padlock 42. As long as the parts occupy this locked position, the supply of fuel is either wholly cut off from the engine or is so reduced that the engine is merely idling, while the brake is held in its applied position.

In order to adjust the invention so as to operate the vehicle on which it is mounted, the lever 36 must be released from the yoke 41 and swung to the position shown in the drawings, thus allowing the brake lever to be swung upwardly to release the brakes, so moving the fuel controlling rod 5 as to permit a maximum amount of fuel to flow to the engine, likewise permitting the clutch lever 9 to be so moved that the engine is caused to drive the vehicle.

I claim:

1. The combination of a brake lever; a pedal thereon; a fuel controlling lever mounted on the brake lever; a push rod connected to said fuel controlling lever and extending through said pedal; a cam mounted coaxially with the brake lever and connected to the fuel controlling lever; with fuel controlling mechanism actuated by the cam.

2. A fuel controlling mechanism comprising a brake lever; a fuel controlling member connected to cause lessening of the fuel supply when it is depressed; with means for holding the brake lever and fuel controlling members in positions to apply the brake and cut down the fuel supply.

3. A fuel controlling mechanism comprising a brake lever; a fuel controlling member connected to cause lessening of the fuel supply when it is depressed; with means for holding the brake lever and fuel controlling member in positions to apply the brake and cut down the fuel supply, the same comprising a bar movable into position to engage said lever and member; with means for locking said bar from movement.

4. A fuel controlling mechanism comprising a brake lever; a clutch controlling lever; a fuel controlling member connected to cause reduction of the fuel supply when it is depressed; and an element for holding said levers and said member in depressed positions.

5. The combination of a steering post; a brake lever; a fuel controlling member; a bar connected to hold said lever and member in depressed positions; and an element on the steering post connected to said bar.

6. In a system of control, the combination with a clutch controlling shaft having an operating lever secured thereto; of a cam loosely mounted on said shaft; fuel controlling mechanism governed by said cam; and a foot controlled member for rotating the cam.

7. In a system of control, the combination with a clutch controlling shaft provided with an operating lever; of a cam loosely mounted on said shaft; fuel controlling mechanism governed by said cam; a foot controlled member for rotating the cam; and a brake lever operatively associated with said foot controlled member to cause simultaneous application of the brake and cutting down of the fuel supply.

ALBERT H. MANWARING.